(12) United States Patent
Chan

(10) Patent No.: US 10,917,443 B2
(45) Date of Patent: Feb. 9, 2021

(54) TELEPHONE COMMUNICATION SYSTEM AND METHOD FOR DYNAMIC ASSIGNMENT OF IP-PBXS

(71) Applicant: Charles Lap San Chan, Taipei (TW)

(72) Inventor: Charles Lap San Chan, Taipei (TW)

( * ) Notice: Subject to any disclaimer, the term of this patent is extended or adjusted under 35 U.S.C. 154(b) by 0 days.

(21) Appl. No.: 16/528,392

(22) Filed: Jul. 31, 2019

(65) Prior Publication Data

US 2020/0099726 A1 Mar. 26, 2020

(30) Foreign Application Priority Data

Sep. 26, 2018 (TW) .............................. 107133727 A

(51) Int. Cl.
| | | |
|---|---|---|
| *H04L 29/06* | (2006.01) | |
| *H04L 29/08* | (2006.01) | |
| *H04L 12/931* | (2013.01) | |
| *H04L 12/933* | (2013.01) | |

(52) U.S. Cl.
CPC ........ *H04L 65/1053* (2013.01); *H04L 63/062* (2013.01); *H04L 65/1069* (2013.01); *H04L 67/26* (2013.01)

(58) Field of Classification Search
CPC . H04L 65/1053; H04L 67/26; H04L 65/1069; H04L 63/062; H04L 49/10; H04L 49/206; H04L 67/10; H04L 65/1006; H04L 63/0236; H04L 9/0822; H04N 21/26613; H04W 12/04031
See application file for complete search history.

(56) References Cited

U.S. PATENT DOCUMENTS

| 6,243,373 B1* | 6/2001 | Turock ................... H04L 29/06 370/352 |
| 9,264,299 B1* | 2/2016 | Palmer ................. H04M 7/122 |
| 2004/0181604 A1* | 9/2004 | Immonen ............ G06F 16/9535 709/232 |

(Continued)

FOREIGN PATENT DOCUMENTS

CN 107623656 * 4/2019 ............. H04W 8/26

OTHER PUBLICATIONS

Cisco Systems, "Cisco SIP IP Administrator Guide", Appendix B, Oct. 31, 2013, 182 pages, pp. B1-B56. (Year: 2013).*

(Continued)

*Primary Examiner* — Arvin Eskandarnia
*Assistant Examiner* — Chhian (Amy) Ling
(74) *Attorney, Agent, or Firm* — Muncy, Geissler, Olds & Lowe, P.C.

(57) ABSTRACT

A telephone communication system and a method for IP-PBXs is disclosed. The system includes a cloud server, a plurality of IP-PBXs each provided with first voice call devices, and a plurality of second voice call devices. The IP-PBXs are registered in the cloud server, each IP-PBX is installed with a first application program, each first voice call device is assigned with a set of extension codes, and each IP-PBX uses the first application program to manage the voice call functions of the first voice call devices. The second voice call devices are registered in the cloud server, each second voice call device is installed with a second application program to perform voice call functions, and the cloud server assigns a set of system assigning codes to each of the IP-PBXs and the second voice call devices.

20 Claims, 10 Drawing Sheets

(56) References Cited

U.S. PATENT DOCUMENTS

2011/0255680 A1* 10/2011 Vuong .............. H04M 3/42374
379/201.02
2017/0214525 A1* 7/2017 Zhao ..................... H04L 9/0822
2018/0063326 A1* 3/2018 Tichauer ............. H04M 3/4936

OTHER PUBLICATIONS

IP.com, "A kind of method and device encapsulating business data packet", CN 107623656 B, English Translation, Apr. 19, 2019. (Year: 2019).*

* cited by examiner

TELEPHONE COMMUNICATION SYSTEM AND METHOD FOR DYNAMIC ASSIGNMENT OF IP-PBXS

This application claims priority for Taiwan patent application no. 107133727 filed on Sep. 26, 2018, the content of which is incorporated by reference in its entirely.

BACKGROUND OF THE INVENTION

Field of the Invention

The present invention relates to a telephone communication system and a method for Internet protocol private branch exchanges (IP-PBXs), particularly to a telephone communication system and a method for IP-PBXs, which use a dynamic IP-PBX assigning process to directly connect and communicate a calling device with a called device.

Description of the Related Art

In the conventional technology, A device communicates with B device using the voice over Internet protocol (VOIP) or the public switched telephone network (PSTN). No matter the VOIP or the PSTN, A device transmits a calling request to B IP-PBX connected to B device through A IP-PBX connected to A device. Then, B IP-PBX assigns a particular telephone "line" to B device and accepts the calling request. Refer to FIGS. 1A-1B, which are diagrams schematically illustrating telephone communication systems in the conventional technology. In general, the telephone communication system shows the exchange system for Internet protocol (IP) phones. The system includes a cloud server 10 and an IP-PBX 12 (or a plurality of IP-PBXs). The IP-PBX 12 is provided with a plurality of voice call devices, namely extensions (A~F) 121~129. Each extension is assigned with a set of extension codes. As shown in FIGS. 1A-1B, the system further includes an independent smartphone (M) 11 not connected to a corresponding IP-PBX. Thus, the smartphone (M) 11 has to be bound to the registered cloud server 10 to establish communication in the system. FIG. 1A shows that the smartphone (M) 11 telephones the extension (E) 125. After dialing the codes of the extension (E) 125 (e.g., dialing the system assigning codes of the extension or dialing the telephone number and the extension codes of the extension), the smartphone (M) 11 transmits a calling request to the IP-PBX 12 connected to the extension (E) 125 through the cloud server 10 since the smartphone (M) 11 is not connected to an IP-PBX. Then, The IP-PBX 12 assigns a particular telephone "line" to the extension (E) 125 and accepts the calling request (as shown by solid lines). FIG. 1B shows that the extension (E) 125 telephones the smartphone (M) 11. The operation of FIG. 1B is like the operation of FIG. 1A.

In general, the abovementioned ways are applied to transmitting traffic volumes. Until now, the VOIP or the PSTN uses the abovementioned ways to establish communication and connection between different locations. However, the conventional communication way has many problems. For example, when the IP-PBX connected to a target phone malfunctions or has a network problem, the target phone is not dialed since the IP-PBX is responsible to managing and assigning a particular telephone "line" to the target phone. Besides, the convention communication way occupies the network bandwidth of a calling terminal and a called terminal. Thus, the users of the calling terminal and the called terminal pay the expense for communication (e.g., pay the expense for communication bandwidth).

To overcome the abovementioned problems, the inventor of the present invention actively researches and seeks breakthroughs based on professional capability for research, development and manufacture and design experience in the field of traffic communication. As shown by the dashed lines of FIGS. 1A-1B, the smartphone (M) 11 executes and automatically logs into its operating system (OS) to record the device identification and the Internet protocol address of the smartphone (M) 11 when the smartphone (M) 11 starts. The inventor studies this mechanism to provide a telephone communication system and a method for IP-PBXs, which use a dynamic IP-PBX assigning process to directly connect and communicate a calling device with a called device. Compared with the conventional technology, the telephone communication method can effectively save the consumption of network bandwidth and improve the efficiency for communication and connection.

SUMMARY OF THE INVENTION

The primary objective of the present invention is to provide a telephone communication system and a method for IP-PBXs, which use a dynamic IP-PBX assigning process to directly connect and communicate a calling device with a called device, thereby saving the consumption of network bandwidth and improving the efficiency for communication and connection.

To achieve the abovementioned objectives, the present invention provides telephone communication system, which comprises a cloud server, a plurality of IP-PBXs each provided with first voice call devices, and a plurality of second voice call devices. The plurality of IP-PBXs is registered in the cloud server, each of the plurality of IP-PBXs is installed with a first application program, each of the first voice call devices is assigned with a set of extension codes, and each of the plurality of IP-PBXs uses the first application program to manage the voice call functions of the first voice call devices. The plurality of second voice call devices is registered in the cloud server, each of the plurality of second voice call devices is installed with a second application program to perform voice call functions, and the cloud server assigns a set of system assigning codes to each of the plurality of IP-PBXs and the plurality of second voice call devices.

Each of the plurality of second voice call devices is a smartphone and the first voice call device is a desktop phone. The desktop phone may be an extension. In the system, the extension telephones the smartphone or the smartphone telephones the extension.

The cloud server establishes a device registered table to record the device identifications and system assigning codes of the plurality of IP-PBXs and the plurality of second voice call devices when the plurality of IP-PBXs and the plurality of second voice call devices are registered in the cloud server. The device registered table records the required information of the plurality of IP-PBXs and the plurality of second voice call devices arranged into an array or comprises corresponding tables that respectively record the required information of the plurality of IP-PBXs and the plurality of second voice call devices arranged into an array.

The present invention provides a telephone communication method performed in a system including a cloud server, IP-PBXs, and voice call devices, two of the voice call devices are respectively used as a calling device and a called device, the calling device directly connects and communicates with the called device using a dynamic IP-PBX assigning process, and the telephone communication method comprising: (A): the cloud server determining the source of a calling request; (B): the cloud server determining the situation of the called device and determining whether the called device is an effective device; and (C): performing the dynamic IP-PBX assigning process according to the situation of the called device, such that the calling IP-PBX or the calling device obtains information including a device identification (ID) and an Internet protocol (IP) address and corresponding to the called device to establish identity confirmation and a connection between the calling device and the called device in a push-notification way or a cloud-command way, wherein the dynamic IP-PBX assigning process satisfies one of conditions (C1), (C2), and (C3): (C1): the cloud server transmits the calling request; (C2): the called device is connected to the called IP-PBX; and (C3): the called device is not connected to the called IP-PBX.

In operation (A), the cloud server determines that the source of the calling request is the calling IP-PBX or the cloud server.

Operation (B) further comprises: (B1): performing operation (B2) when the calling IP-PBX transmits the calling request, and the dynamic IP-PBX assigning process satisfying condition (C1) when the cloud server transmits the calling request; (B2): the calling IP-PBX transmitting the calling request to the cloud server and requesting the cloud server to determine whether the called device is the effective device; (B3): the cloud server determining whether the called device is the effective device: if no, transmitting an ineffective message to the calling IP-PBX and rejecting the calling request; and if yes, performing operation (B4); (B4): the cloud server determining whether the called device is connected to the called IP-PBX: if yes, performing operation (B5); and if no, performing operation (B6); (B5): transmitting an Internet protocol (IP) address of the called IP-PBX to the calling IP-PBX and the dynamic IP-PBX assigning process satisfying condition (C2); and (B6): transmitting a device identification (ID) of the called device to the calling IP-PBX and the dynamic IP-PBX assigning process satisfying condition (C3).

The dynamic IP-PBX assigning process satisfying condition (C1) further comprises: (C11): the cloud server transmitting the calling request to the called IP-PBX connected to the called device and requesting the called IP-PBX to determine whether the called device accepts the calling request; (C12): the called IP-PBX transmitting its Internet protocol address to the cloud server after the called IP-PBX determines that the called device accepts the calling request, and the called IP-PBX transmitting a rejecting message to the cloud server when the called device rejects the calling request; (C13): the cloud server transmitting the Internet protocol address of the called IP-PBX to the calling device; (C14): the calling device establishing a connection with the called IP-PBX according to the Internet protocol address of the called IP-PBX and transmitting a calling invitation to the called device; and (C15): the called IP-PBX establishing a calling connection between the calling device and the called device after the called IP-PBX accepts the calling invitation.

The dynamic IP-PBX assigning process satisfying condition (C2) further comprises: (C21): the cloud server transmitting the Internet protocol address of the called IP-PBX to the calling IP-PBX; (C22): the calling IP-PBX receiving the Internet protocol address of the called IP-PBX, thereby establishing a connection with the called IP-PBX and transmitting a calling invitation to the called IP-PBX; (C23): the called IP-PBX transmitting a device identification of the called device to the calling IP-PBX after the called IP-PBX accepts the calling invitation; (C24): the calling IP-PBX receiving the device identification of the called device, editing a calling push document to record the device identification of the called device and an Internet protocol address of the calling IP-PBX, transmitting the calling push document to a push server, and requesting the push server to transmit a calling push notification and the calling push document to the called device; (C25): the called device receiving the calling push notification and establishing a connection with the calling IP-PBX according to a content of the calling push document; and (C26): the calling IP-PBX establishing a calling connection between the called device and the calling device.

The dynamic IP-PBX assigning process satisfying condition (C3) further comprises: (C31): the cloud server transmitting a device identification of the called device to the calling IP-PBX; (C32): the calling IP-PBX editing a calling push document to record the device identification of the called device and the Internet protocol address of the calling IP-PBX, transmitting the calling push document to a push server, and requesting the push server to transmit a calling push notification and the calling push document to the called device; (C33): the called device receiving the calling push notification and the calling push document, establishing a connection with the calling IP-PBX according to a content of the calling push document, and registering the related information and the Internet protocol address of the called device in the calling IP-PBX; and (C34): the calling IP-PBX transmitting a calling invitation to the called device, and the called device establishing a calling connection between the called device and the calling device after the called device accepts the calling invitation.

The calling push document further comprises a set of system assigning codes.

As mentioned above, the present invention uses a dynamic IP-PBX assigning process to directly connect and communicate a calling device with a called device, thereby saving the consumption of network bandwidth and improving the efficiency for communication and connection.

Below, the embodiments are described in detail in cooperation with the drawings to make easily understood the technical contents, characteristics and accomplishments of the present invention.

DETAILED DESCRIPTION OF THE INVENTION

The present invention provides a telephone communication system and a method for IP-PBXs. The system comprises a cloud server, a plurality of Internet protocol private branch exchanges (IP-PBXs), voice call devices, wherein the plurality of IP-PBXs and the voice call devices are registered in the cloud server. The present invention uses a dynamic IP-PBX assigning process to directly connect and communicate a calling device with a called device, thereby saving the consumption of network bandwidth and improving the efficiency for communication and connection. The preferred embodiment of the present invention id described as follows.

Figure 2:
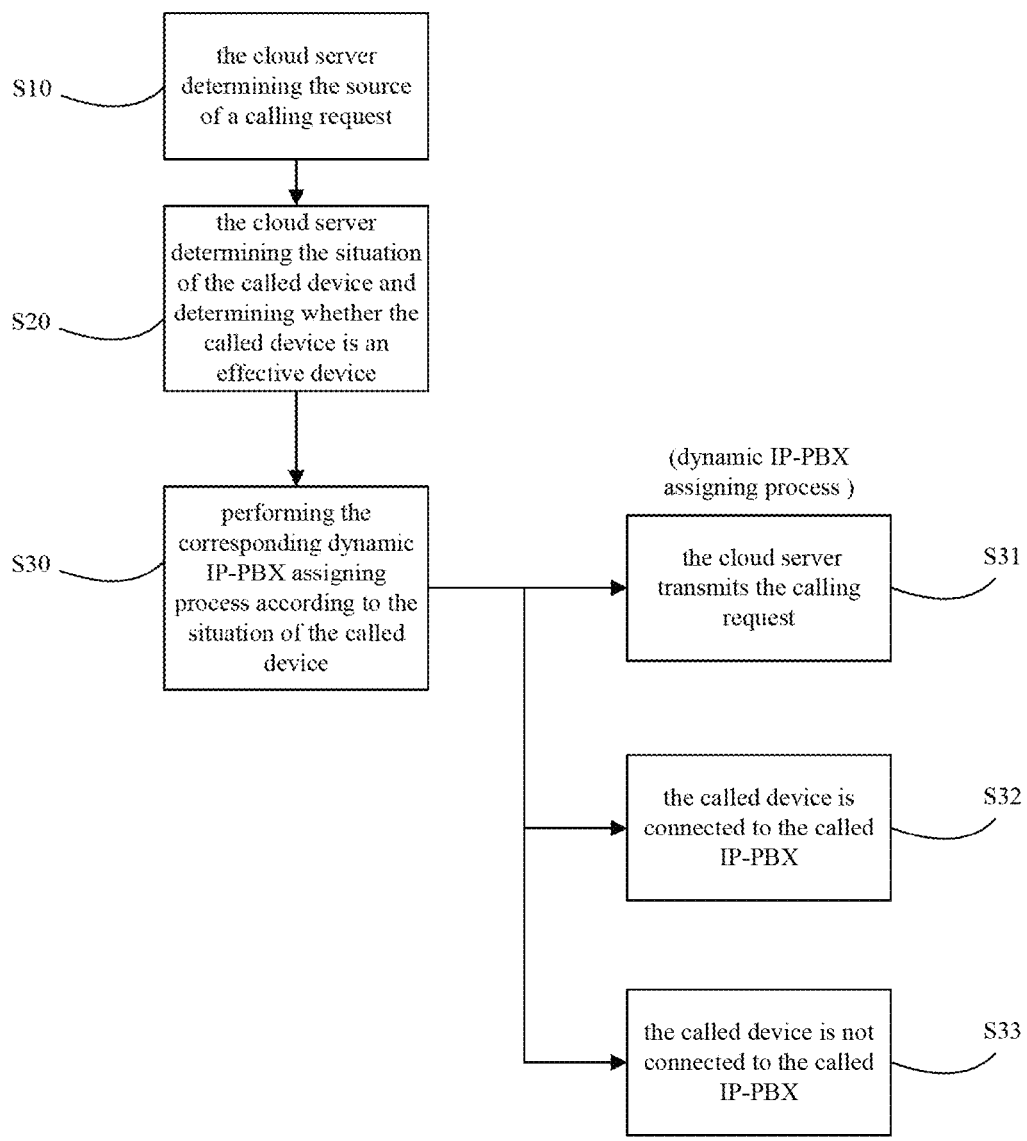
FIG. 2 is a flowchart of a telephone communication method according to an embodiment of the present invention.

Refer to FIG. 2. FIG. 2 is a flowchart of a telephone communication method according to an embodiment of the present invention. The telephone communication method comprises:

Step S10: the cloud server determines the source of a calling request;

Step S20: the cloud server determines the situation of the called device and determines whether the called device is an effective device; and Step S30: the dynamic IP-PBX assigning process is performed according to the situation of the called device, wherein the dynamic IP-PBX assigning process satisfies one of conditions S31, S32, and S33: S31: the cloud server transmits the calling request; S32: the called device is connected to the called IP-PBX; and S33: the called device is not connected to the called the IP-PBX.

According the abovementioned steps, the calling IP-PBX or the calling device obtains information including a device identification (ID) and an Internet protocol (IP) address and corresponding to the called device to establish identity confirmation and a connection between the calling device and the called device in a push-notification way or a cloud-command way.

Figure 5A:
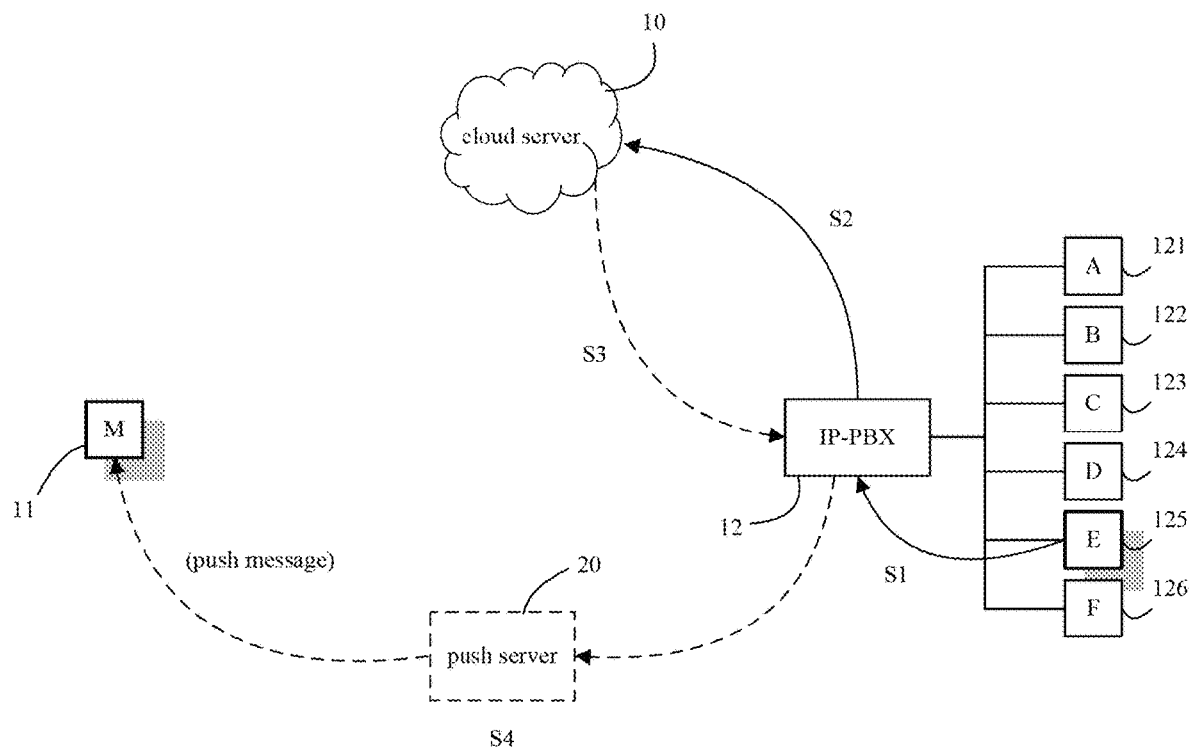
FIGS. 5A-5B are diagrams schematically illustrating telephone communication systems according to an embodiment of the present invention, wherein a desktop phone bound to an IP-PBX dials a smartphone not connected to an IP-PBX.
Figure 5B:
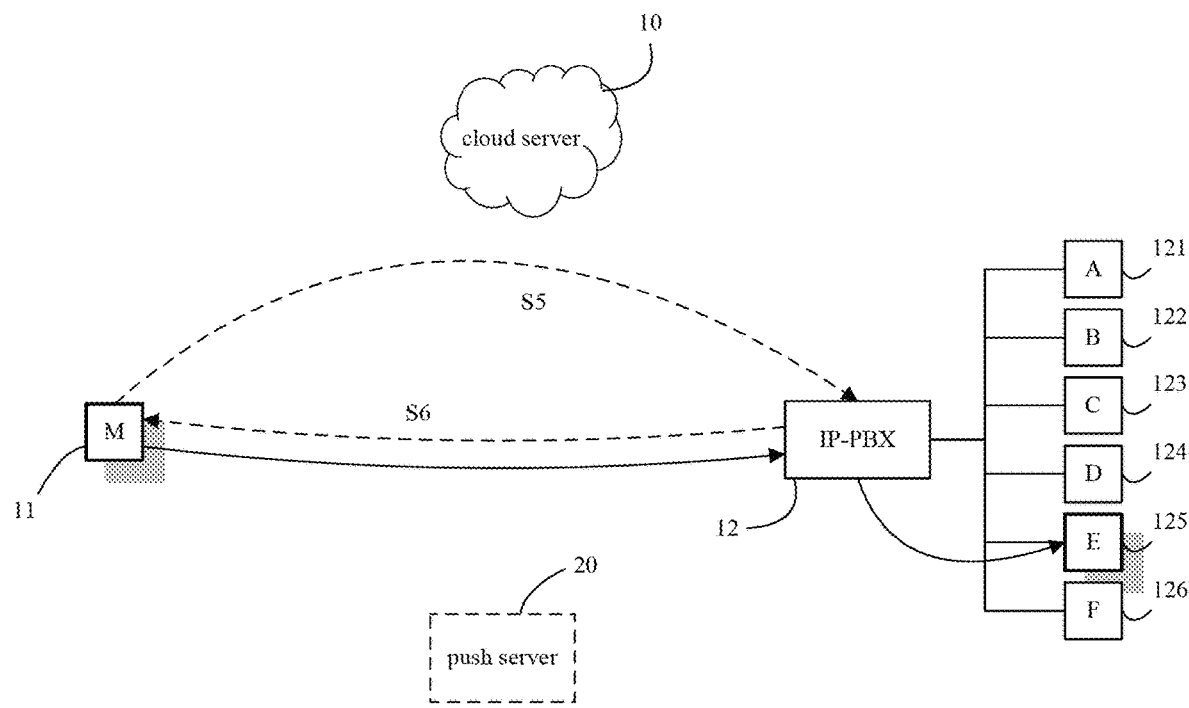

In Step S10, the cloud server determines that the source of the calling request is the calling IP-PBX or the cloud server. FIGS. 5A-5B show that the calling request comes from the IP-PBX or the cloud server in detail.

Figure 3:
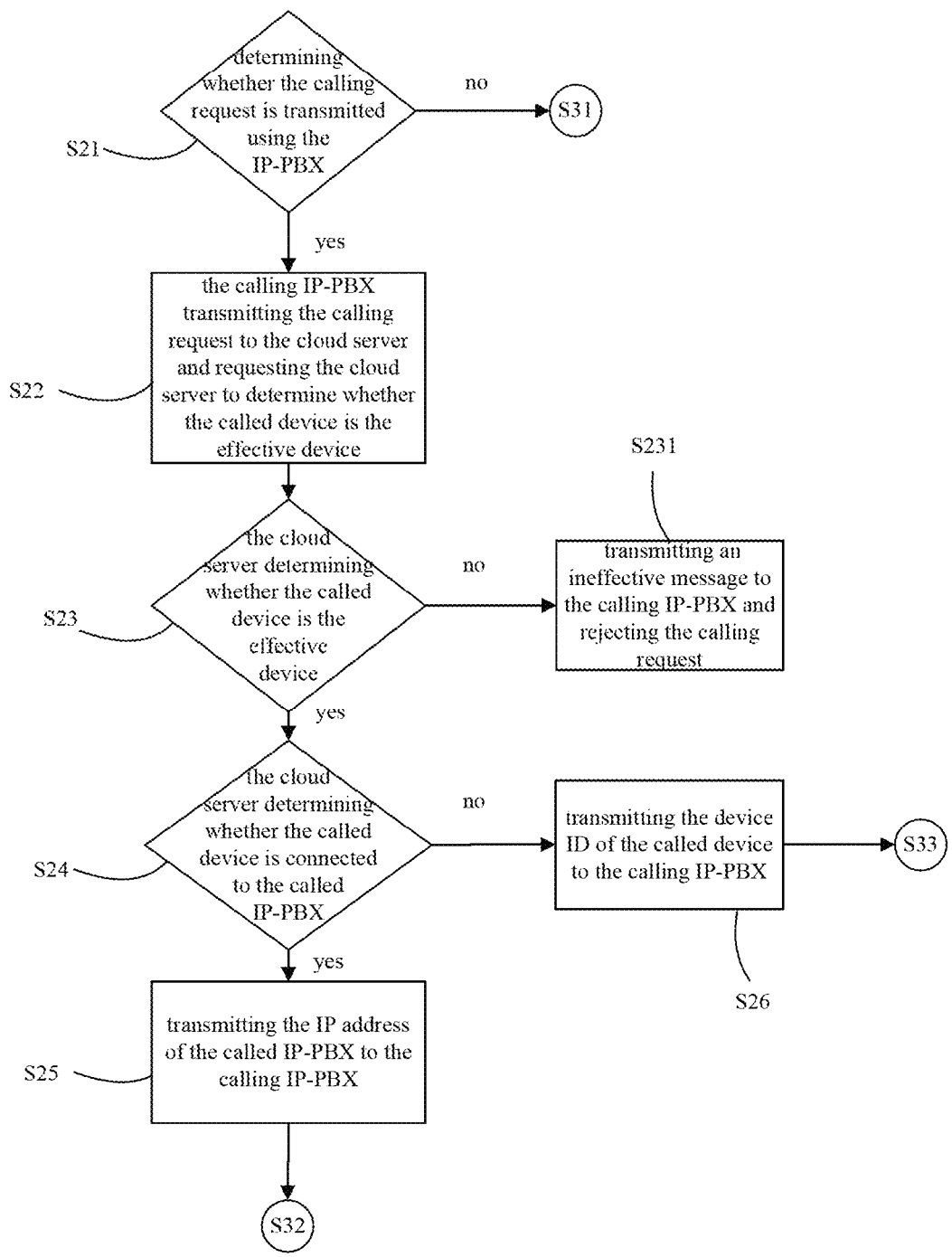
FIG. 3 is a flowchart of a part of a telephone communication method according to an embodiment of the present invention.

Refer to FIG. 3. FIG. 3 is a flowchart of a part of a telephone communication method according to an embodiment of the present invention. The flowchart is used to determine whether the called device is an effective device. Step S20 further comprises: Step S21: Step S22 is performed when the calling IP-PBX transmits the calling request; and condition S31 is satisfied by the dynamic IP-PBX assigning process when the cloud server transmits the calling request; Step S22: the calling IP-PBX transmits the calling request to the cloud server and requests the cloud server to determine whether the called device is the effective device; Step S23: the cloud server determines whether the called device is the effective device: if the answer is no, an ineffective message is transmitted to the calling IP-PBX and the calling request is rejected, as shown in Step S231; and if the answer is yes, Step S24 is performed; Step S24: the cloud server determines whether the called device is connected to the called IP-PBX: if the answer is yes, Step S25 is performed; and if the answer is no, Step S26 is performed; Step S25: the Internet protocol (IP) address of the called IP-PBX is transmitted to the calling IP-PBX and condition S32 is satisfied by the dynamic IP-PBX assigning process; and Step S26: the device identification (ID) of the called device is transmitted to the calling IP-PBX and condition S33 is satisfied by the dynamic IP-PBX assigning process.

Figure 4A:
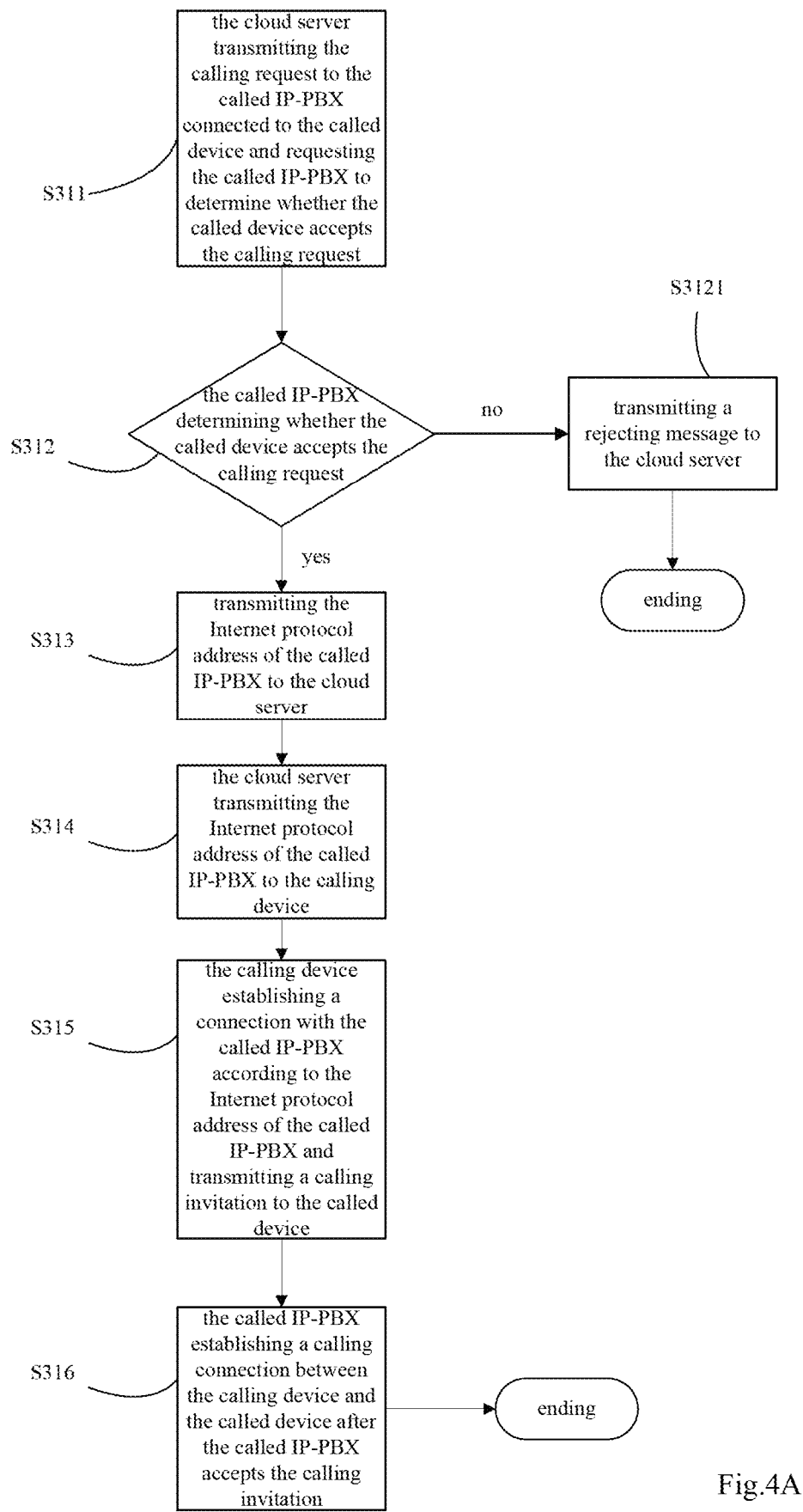
FIGS. 4A-4C are flowcharts of dynamic IP-PBX assigning processes according to an embodiment of the present invention.
Figure 4B:
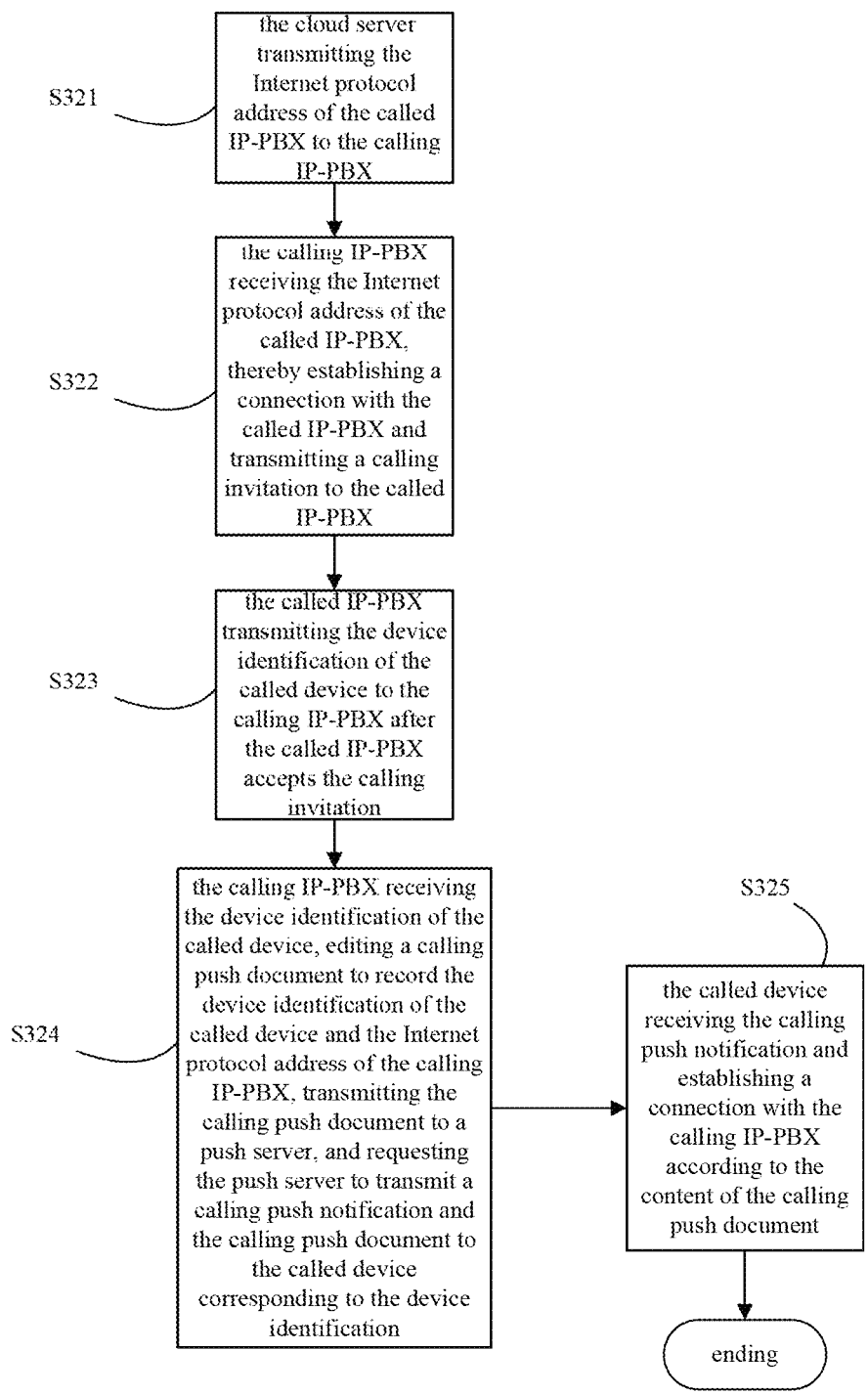
Figure 4C:
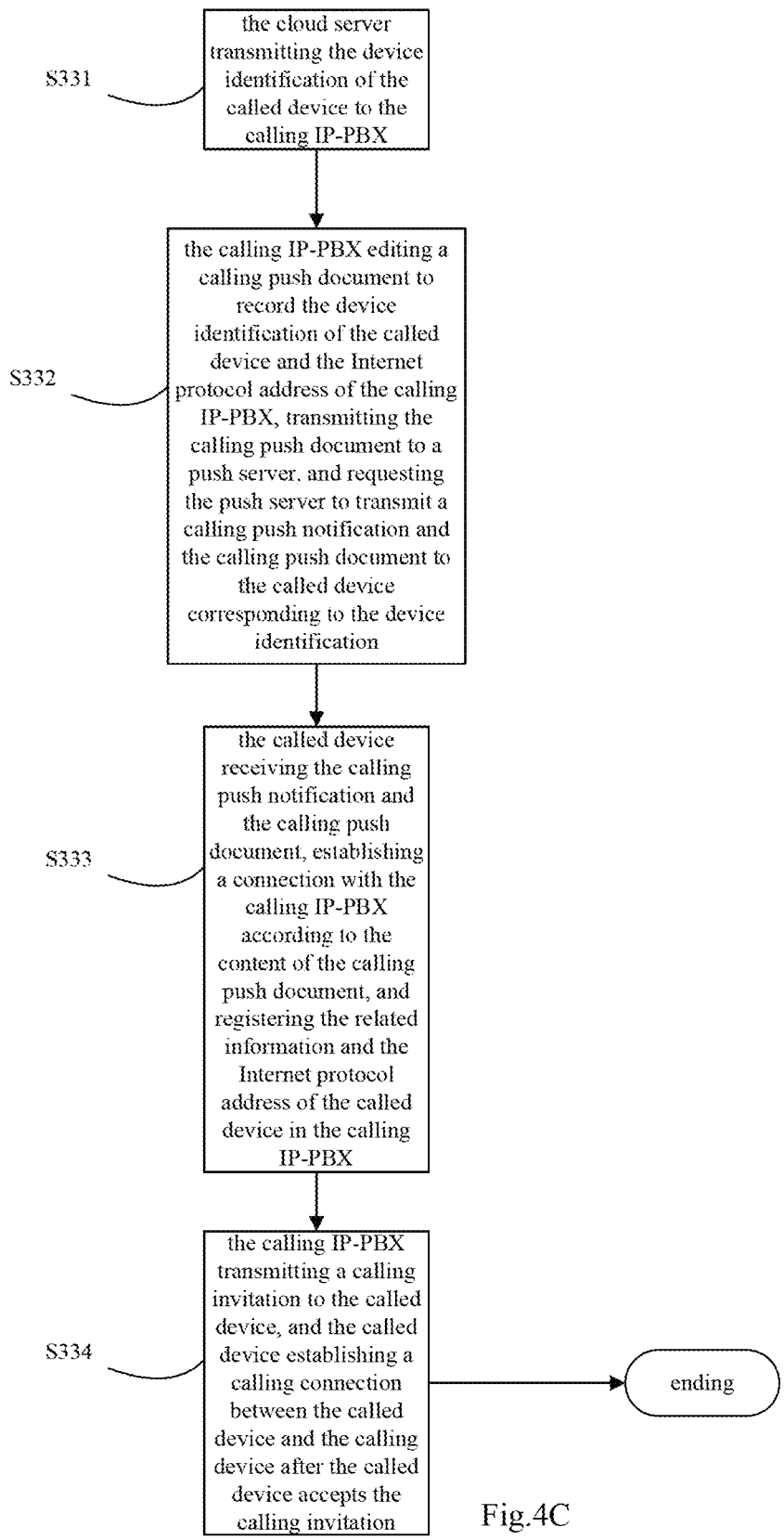

The dynamic IP-PBX assigning process satisfying one of conditions S31, S32, and S33 is detailed as follows. Refer to FIGS. 4A-4C. FIGS. 4A-4C are flowcharts of dynamic IP-PBX assigning processes according to an embodiment of the present invention. The dynamic IP-PBX assigning process satisfying condition S31 further comprises: Step S311: the cloud server transmits the calling request to the called IP-PBX connected to the called device and requests the called IP-PBX to determine whether the called device accepts the calling request; Step S312 (S312 and S313 belong to the same step): the called IP-PBX transmits its Internet protocol address to the cloud server after the called IP-PBX determines that the called device accepts the calling request, and the called IP-PBX transmits a rejecting message to the cloud server when the called device rejects the calling request, as shown in Step S3121; Step S313: the cloud server transmits the Internet protocol address of the called IP-PBX to the calling device; Step S314: the calling device establishes a connection with the called IP-PBX according to the Internet protocol address of the called IP-PBX and transmits a calling invitation to the called device; and Step S315: the called IP-PBX establishes a calling connection between the calling device and the called device after the called IP-PBX accepts the calling invitation.

The dynamic IP-PBX assigning process satisfying condition S32 further comprises: Step S321: the cloud server transmits the Internet protocol address of the called IP-PBX to the calling IP-PBX; Step S322: the calling IP-PBX receives the Internet protocol address of the called IP-PBX, thereby establishing a connection with the called IP-PBX and transmitting a calling invitation to the called IP-PBX; Step S323: the called IP-PBX transmits the device identification of the called device to the calling IP-PBX after the called IP-PBX accepts the calling invitation; Step S324: the calling IP-PBX receives the device identification of the called device, edits a calling push document to record the device identification of the called device and the Internet protocol address of the calling IP-PBX, transmits the calling push document to a push server, and requests the push server to transmit a calling push notification and the calling push document to the called device corresponding the device identification; and Step S325: the called device receives the calling push notification and establishes a connection with the calling IP-PBX according to the content of the calling push document (including the step of the calling IP-PBX establishing a calling connection between the called device and the calling device).

The dynamic IP-PBX assigning process satisfying condition S33 further comprises: Step S331: the cloud server transmits the device identification of the called device to the calling IP-PBX; Step S332: the calling IP-PBX edits a calling push document to record the device identification of the called device and the Internet protocol address of the calling IP-PBX, transmits the calling push document to a push server, and requests the push server to transmit a calling push notification and the calling push document to the called device; Step S333: the called device receives the calling push notification and the calling push document, establishes a connection with the calling IP-PBX according to the content of the calling push document, and registers the related information and the Internet protocol address of the called device in the calling IP-PBX; and Step S334: the calling IP-PBX transmits a calling invitation to the called device, and the called device establishes a calling connection between the called device and the calling device after the called device accepts the calling invitation.

The calling push document further comprises a set of system assigning codes of the IP-PBX. When the voice call devices or the IP-PBXs are registered in the cloud server, the cloud server assigns a set of independent system assigning codes. In a preferred embodiment, the cloud server assigns a set of system assigning codes to each of the voice call devices, wherein the set of system assigning codes includes at least ten codes. For example, the system assigning codes of the voice call device are set to *2000081101 and the system assigning codes of the IP-PBX are set to *2000011001. The IP-PBX uses its system assigning codes and an extension code to form a corresponding system assigning codes assigned to an extension connected to the IP-PBX. For example, the system assigning codes of extension A are set to *2000011002 and the system assigning codes of extension B are set to *2000011003. The system assigning codes are the internally-dialed codes of the system and different from a telephone number. Only the external users need to dial the telephone number to communicate with the assigned device and its extension of the system.

Below, the embodiments are described in detail in cooperation with the drawings to make easily understood the technical contents, characteristics and accomplishments of the present invention. Refer to FIGS. 5A-5B. FIGS. 5A-5B are diagrams schematically illustrating telephone communication systems according to an embodiment of the present invention, wherein a desktop phone bound to an IP-PBX dials a smartphone not connected to an IP-PBX. The system of the present invention comprises a cloud server 10, a plurality of IP-PBXs 12 each provided with first voice call devices 121-126, and a plurality of second voice call devices 11. The first voice call devices 121-126 are registered in the IP-PBX 12. The plurality of IP-PBXs 12 are registered in the cloud server 10, each IP-PBX 12 is installed with a first application program, each first voice call device 11 is assigned with a set of extension codes, and each IP-PBX 12 uses the first application program to manage the voice call functions of the first voice call devices 121-126. The second voice call devices 11 are registered in the cloud server 10, each second voice call device 11 is installed with a second application program to perform voice call functions, and the cloud server 10 assigns a set of system assigning codes (as mentioned above) to each of the IP-PBXs 12 and the second voice call devices 11. In order to simplify the description, FIGS. 5A-5B show one cloud server 10, one IP-PBX 12, and one second voice call device 11 and Steps S1-S6 of the method of the present invention.

Each of the plurality of second voice call devices 11 is a smartphone and the first voice call devices 121-126 are desktop phones. The desktop phones may be extensions. In the system, the first voice call devices 121-126 telephone the second voice call device 11 or the second voice call device 11 telephones the first voice call devices 121-126. In the embodiment, the second voice call device 11 is an independent smartphone not connected to a corresponding IP-PBX. Thus, the smartphone has to be bound to the registered cloud server 10 to establish communication and connection in the system.

Refer to FIGS. 5A-5B. The extension E 125 connected to the IP-PBX 12 dials the smartphone 11 in the system. The extension E 125 is a calling device. Steps S1-S6 are used to describe the process of generating and accepting a calling request, wherein a solid line represents the conventional technology and a dashed line represents the feature of the present invention, such that the examiner can clearly understand the difference between the present invention and the conventional technology. One of Steps S1-S6 includes several steps of the method of the present invention. Steps S1-S6 will cooperate with the method of the present invention to be described.

The extension E 125 generates and transmits a calling request to the smartphone 11 through the IP-PBX 12, as shown by Step S1. After receiving the calling request, the IP-PBX 12 transmits the calling request to the cloud server 10, as shown by Step S2. Step S1 is included in Step S10. In other words, the cloud server 10 determines that the source of the calling request is the extension E 125 connected to the IP-PBX 12. Besides, Step S2 is also included in Step S22. The calling IP-PBX 12 transmits the calling request to the cloud server 10 and requests to determine whether the smartphone 11 (e.g., the called device) is the effective device in the system. The cloud server 10 determines whether the smartphone 11 (e.g., the called device) is the effective device. In the embodiment, the smartphone 11 (e.g., the called device) is the effective device. Thus, the cloud server 10 continues determining whether the smartphone 11 (e.g., the called device) is connected to the called IP-PBX. In the embodiment, the smartphone 11 (e.g., the called device) is not connected to the called IP-PBX. As a result, the cloud server transmits the device identification (ID) of the smartphone 11 (e.g., the called device) to the calling IP-PBX 12, as shown by Step S3. Also, the dynamic IP-PBX assigning process satisfying condition S33 is performed. Step S3 includes Steps S23-S26 to achieve the purpose of dynamically assigning the IP-PBX.

Step S4 includes Steps S331-S334 of Step S33. In Step S331, the cloud server 10 transmits the device identification of the called device to the calling IP-PBX 12. Then, in Step S332, the calling IP-PBX 12 edits a calling push document to record the device identification of the smartphone 11 (e.g., the called device) and the Internet protocol address of the calling IP-PBX 12, transmits the calling push document to a push server 20, and requests the push server 20 to transmit a calling push notification and the calling push document to the smartphone 11 (e.g., the called device) corresponding to the device identification. The calling push document further comprises a set of system assigning codes of the IP-PBX 12 (as mentioned above, the system assigning codes of the IP-PBX are set to *2000011001). In order to use the Internet protocol address to connect the called device (e.g., the smartphone) to the calling IP-PBX 12, the Internet protocol address of the calling IP-PBX 12 is recorded. Recording the device identification of the smartphone 11 (e.g., the called device) determines a calling object and guarantees calling safety.

Figure 1A:
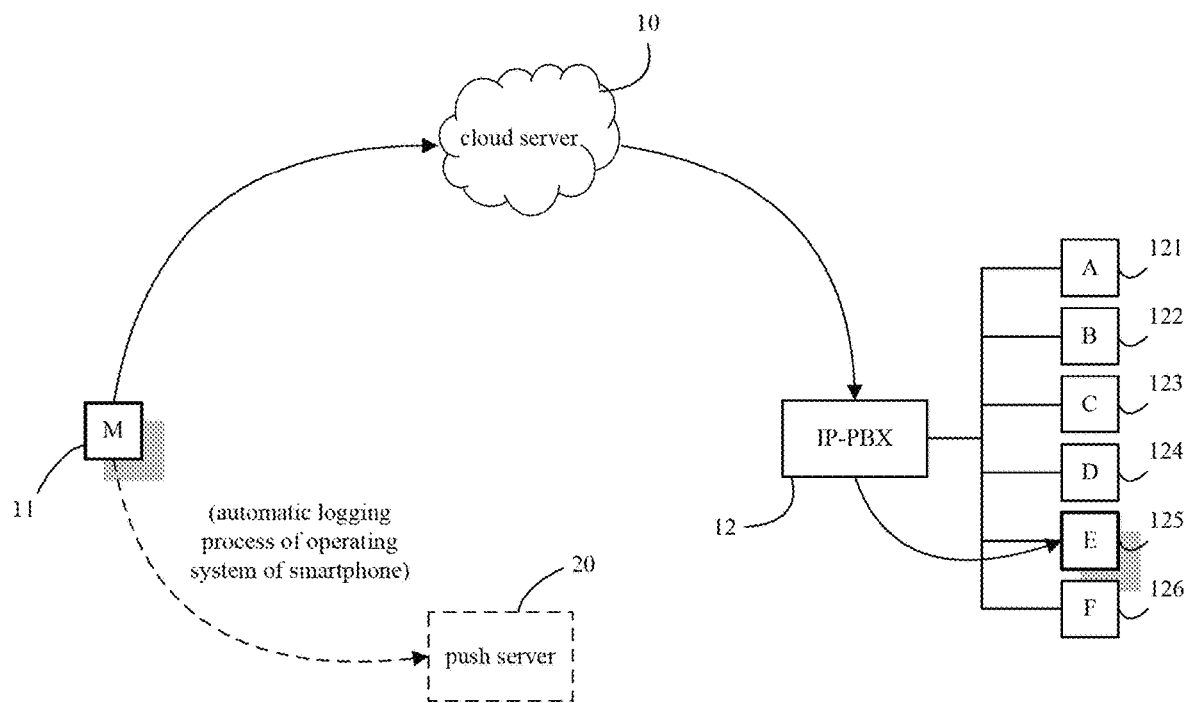
FIGS. 1A-1B are diagrams schematically illustrating telephone communication systems in the conventional technology.
Figure 1B:
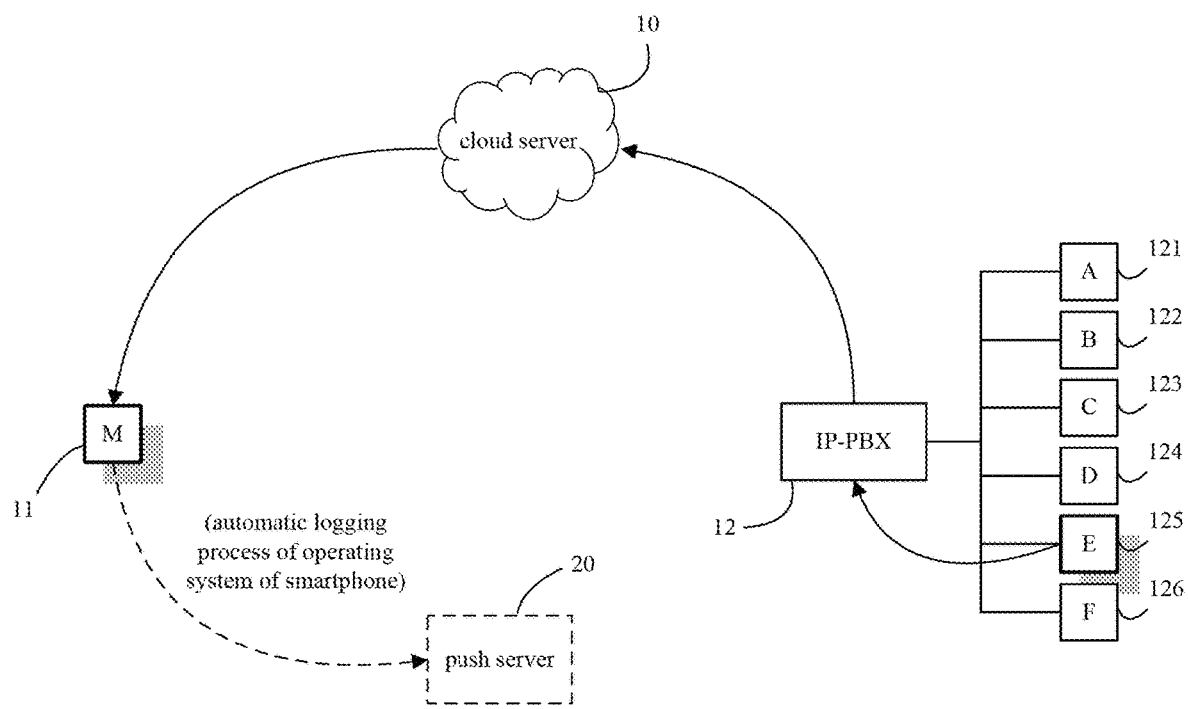

As shown in FIGS. 1A-1B, the smartphone 11 performs and automatically logs into its operating system (OS) to record the device identification and the Internet protocol address of the smartphone 11 when the smartphone 11 starts. At present, the operating system of the smartphone 11 is divided into the Android system and the Apple system, which respectively provide two corresponding push servers. The push servers are respectively transmit push notifications to corresponding mobile devices, which is the conventional technology so will not be reiterated. The present invention uses the smartphone 11 and the push function of the OS to edit a calling push document, transmits the calling push document to the push server 20 corresponding to the smartphone 11, and requests the push server 20 to transmit a calling push notification and the calling push document to the smartphone 11 (e.g., the called device) corresponding to the device identification, thereby notifying the smartphone 11 of a call. The present invention subverts the conventional telephone communication method.

Then, in Step S333, the smartphone 11 (e.g., the called device) receives the calling push notification and the calling push document, establishes a connection with the calling IP-PBX 12 according to the content of the calling push document, and registers the related information and the Internet protocol address of the called device in the calling IP-PBX 12. Finally, in Step S334, the calling IP-PBX 12 transmits a calling invitation to the called device (e.g., the smartphone 11) when the calling device (e.g., the extension E 125) is idle, and the called device (e.g., the smartphone 11) establishes a calling connection between the called device and the calling device after the called device accepts the calling invitation.

Compared with the conventional technology, the telephone communication method of the present invention effectively save the consumption of network bandwidth and improve the efficiency for communication and connection.

Figure 6A:
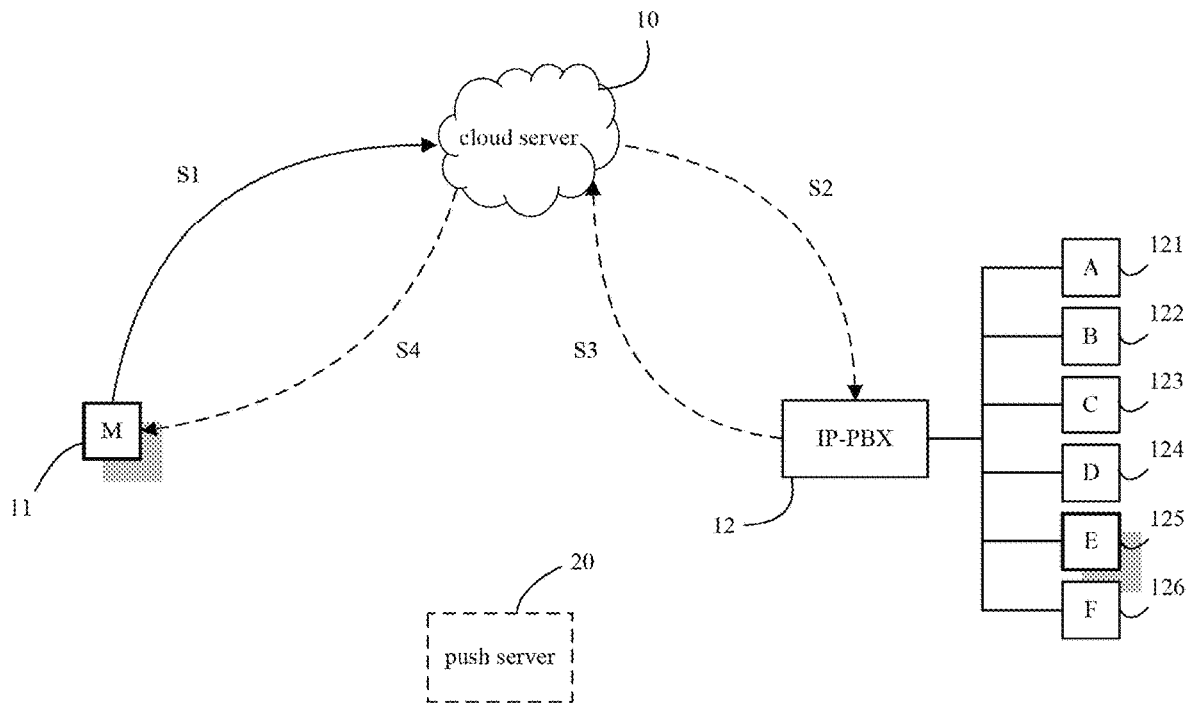
FIGS. 6A-6B are diagrams schematically illustrating telephone communication systems according to an embodiment of the present invention, wherein a smartphone not bound to an IP-PBX dials a desktop phone bound to an IP-PBX.
Figure 6B:
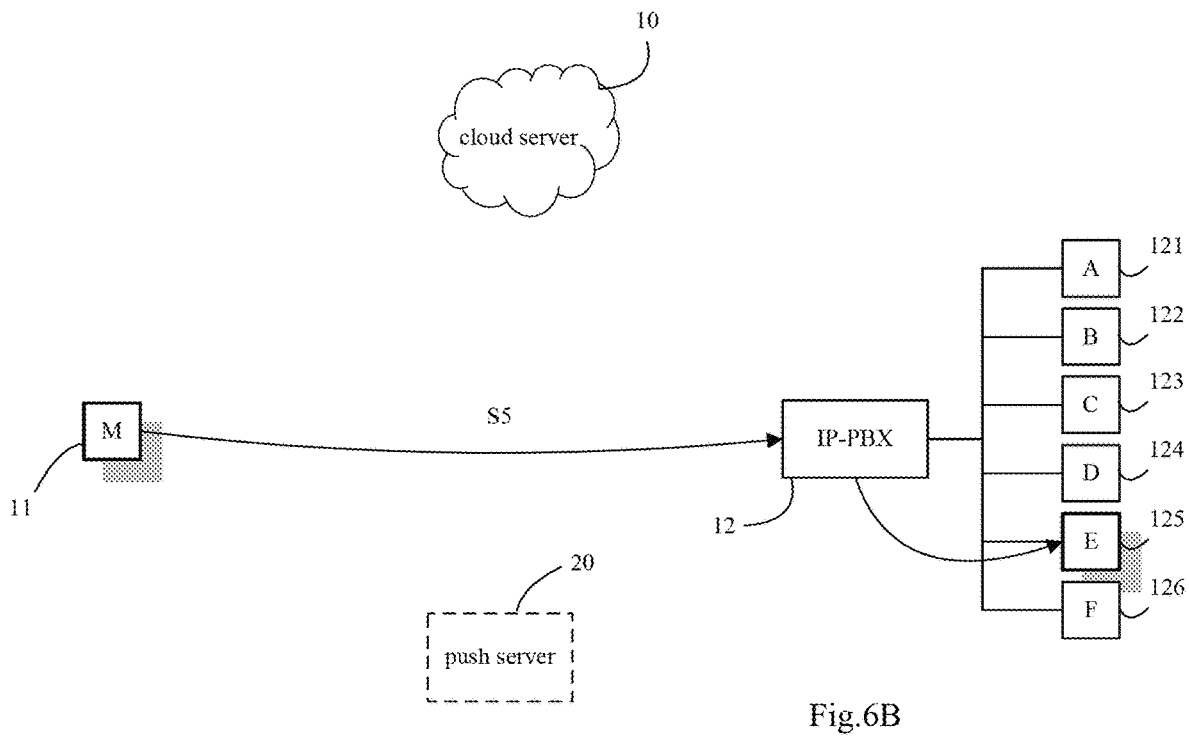

FIGS. 6A-6B are diagrams schematically illustrating telephone communication systems according to an embodiment of the present invention, wherein a smartphone not connected to an IP-PBX dials a desktop phone connected to an IP-PBX. Refer to FIGS. 6A-6B. The smartphone 11 has to be bound to the registered cloud server 10 to establish connection and communication in the system since the independent smartphone 11 is not connected to the IP-PBX. Thus, when the smartphone 11 generates a calling request to dial the extension E 125 corresponding to the called IP-PBX 12 (as mentioned above, dialing the system assigning codes of the extension E 125 to establish connection and communication due to within the same system), the smartphone 11 directly transmits the calling request to the cloud server 10, as shown by Step S1. Steps S1-S5 are used to describe the process of generating and accepting the calling request, wherein a solid line represents the conventional technology and a dashed line represents the feature of the present invention, such that the examiner can clearly understand the difference between the present invention and the conventional technology. One of Steps S1-S5 includes several steps of the method of the present invention. Steps S1-S5 will cooperate with the method of the present invention to be described.

After receiving the calling request, the cloud server 10 uses the calling request to determine the source of the calling request is the smartphone 11. Step S1 is included in Step S10. Then, Step S21 of Step S20 is performed. In Step S21, the process determines whether the IP-PBX transmits the calling request. In the embodiment, the calling request is not transmitted by the IP-PBX. Thus, the dynamic IP-PBX assigning process satisfying condition S31 is performed. Condition S31 is satisfied by the dynamic IP-PBX assigning process when the cloud server transmits the calling request. The dynamic IP-PBX assigning process satisfying condition S31 comprises: Step S311: the cloud server 10 transmits the calling request to the called IP-PBX 12 connected to the called device (e.g., the extension E 125) and requests the called IP-PBX to determine whether the called device (e.g., the extension E 125) accepts the calling request, as shown by Step S2; Step S312 (S312 and S313 belong to the same step): the called IP-PBX 12 transmits its Internet protocol address to the cloud server 10 after the called IP-PBX 12 determines that the called device accepts the calling request, as shown by Step S3; Step S313: the cloud server 10 transmits the Internet protocol address of the called IP-PBX 12 to the calling device (e.g., the smartphone 11), as shown by Step S4; and Step S314: the calling device (e.g., the smartphone 11) establishes a connection with the called IP-PBX 12 according to the Internet protocol address of the called IP-PBX 12 and transmits a calling invitation to the called device (e.g., the extension E 125), as shown by Step S5. Step S5 includes following Step S315: the called IP-PBX 12 establishes a calling connection between the calling device (e.g., the smartphone 11) and the called device (e.g., the extension E 125) after the called IP-PBX 12 accepts the calling invitation.

Step S312 (S312 and S313 belong to the same step) further comprises a step of establishing a call waiting sequence for recording the related information of the calling request, such as calling time and calling numbers. Step S312 further comprises a step of transmitting a key to the cloud server 10. In Step S313, the cloud server 10 transmits the key to the calling device (e.g., the smartphone 11). In Step S314, the cloud server 10 transmits a key to the called IP-PBX 12 for using a key-decrypting certification process. The key-decrypting certification process is performed when the called IP-PBX 12 connects and communicates with the calling device (e.g., the smartphone 11). The key-decrypting certification process is performed in many conventional ways so will not be reiterated.

As mentioned above, the device (e.g., the extension) connected to the IP-PBX dials the mobile device (e.g., the smartphone) not connected to the IP-PBX. Alternatively, the mobile device (e.g., the smartphone) not connected to the IP-PBX dials the device (e.g., the extension) connected to the IP-PBX. The telephone communication method of various extensions (including mobile devices connected to an IP-PBX) is described as follows.

Figure 7A:
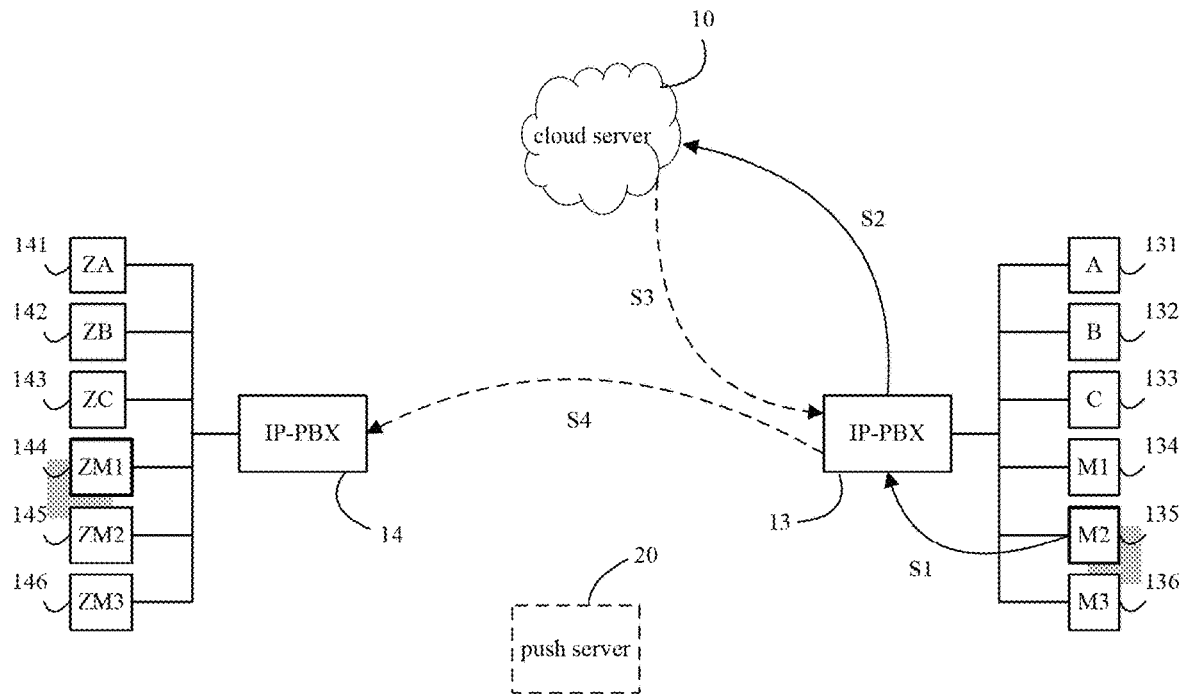
FIGS. 7A-7B are diagrams schematically illustrating telephone communication systems according to an embodiment of the present invention, wherein a smartphone bound to an IP-PBX dials another smartphone bound to an IP-PBX.
Figure 7B:
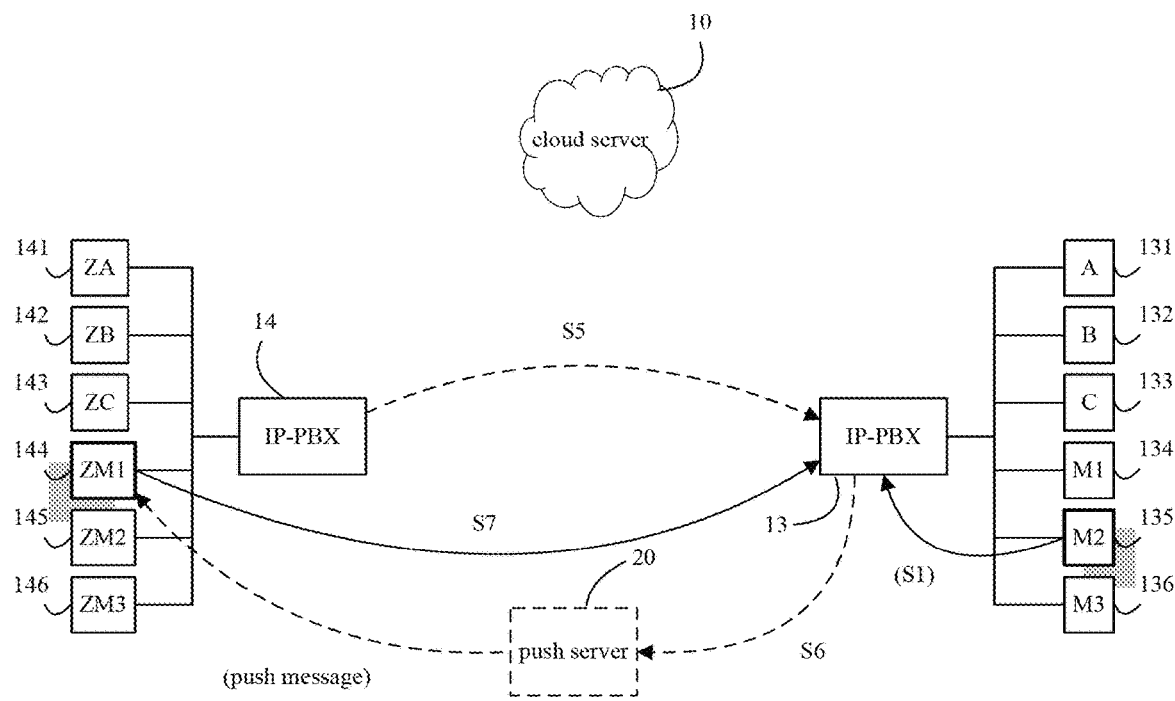

Refer to FIGS. 7A-7B. FIGS. 7A-7B are diagrams schematically illustrating telephone communication systems according to an embodiment of the present invention, wherein a smartphone bound to an IP-PBX dials another smartphone bound to an IP-PBX. A smartphone M2 135 connected an IP-PBX 13 dials a smartphone ZM1 144 connected to another IP-PBX 14. The smartphone M2 135 connected the IP-PBX 13 is a calling device. Steps S1-S7 are used to describe the process of generating and accepting a calling request, wherein a solid line represents the conventional technology and a dashed line represents the feature of the present invention. Step S7 is a novel telephone communication method of the present invention and thus represented by a solid line, such that the examiner can clearly understand the difference between the present invention and the conventional technology. One of Steps S1-S7 includes several steps of the method of the present invention. Steps S1-S7 will cooperate with the method of the present invention to be described.

Refer to FIGS. 7A-7B. The IP-PBXs 13 and 14 set desktop phones and mobile devices (e.g., smartphones) to be extensions. For example, the IP-PBX 13 is connected to extensions A-C 131-133 and mobile devices (e.g., smartphones) M1-M3 134-136. In the embodiment, the smartphone M2 135, bound to the IP-PBX 13 and used as a calling device, generates a calling request. Thus, the calling request is transmitted using the IP-PBX 13. The IP-PBX 13 transmits the calling request to the cloud server 10 after receiving the calling request, as shown by Step S2. Step S2 is included in Step S10. In other words, the cloud server 10 determines that the source of the calling request is the smartphone M2 135 connected to the IP-PBX 13. Besides, Step S2 is also included in Step S22. The calling IP-PBX 13 transmits the calling request to the cloud server 10 and requests to determine whether the called smartphone ZM1 144 (e.g., the called device) is the effective device in the system. The cloud server 10 determines whether the smartphone ZM1 144 (e.g., the called device) is the effective device. In the embodiment, the smartphone ZM1 144 (e.g., the called device) is the effective device (due to that fact that the IP-PBX 14 connected to the smartphone ZM1 144 is registered in the cloud server 10). Thus, the cloud server 10 continues with Step S24 of determining whether the smartphone ZM1 144 (e.g., the called device) is connected to the called IP-PBX. In the embodiment, the smartphone ZM1 144 (e.g., the called device) is connected to the called IP-PBX 14. As a result, the cloud server 10 performs the dynamic IP-PBX assigning process satisfying condition S32. Condition S32 is satisfied by the dynamic IP-PBX assigning process when the called device is connected to the called IP-PBX. The dynamic IP-PBX assigning process satisfying condition S32 further comprises: Step S321: the cloud server 10 transmits the Internet protocol address of the called IP-PBX 14 to the calling IP-PBX 13, as shown by Step S3; Step S322: the calling IP-PBX 13 receives the Internet protocol address of the called IP-PBX 14, thereby establishing a connection with the called IP-PBX 14 and transmitting a calling invitation to the called IP-PBX 14, as shown by Step S4; Step S323: the called IP-PBX 14 transmits the device identification of the smartphone ZM1 144 (e.g., the called device) to the calling IP-PBX 13 after the called IP-PBX 14 accepts the calling invitation, as shown by Step S5; Step S324: the calling IP-PBX 13 receives the device identification of the smartphone ZM1 144 (e.g., the called device), edits a calling push document to record the device identification of the smartphone ZM1 144 (e.g., the called device) and the Internet protocol address of the calling IP-PBX 13, transmits the calling push document to a push server 20, and requests the push server 20 to transmit a calling push notification and the calling push document to the called device (e.g., the smartphone ZM1 144) corresponding the device identification, as shown by Step S6; and Step S325: the called device (e.g., the smartphone ZM1 144) receives the calling push notification and establishes a connection with the calling IP-PBX 13 according to the content of the calling push document (including the step of the calling IP-PBX 13 establishing a calling connection between the called device and the calling device), as shown by Step S7. It is noted that the called device (e.g., the smartphone ZM1 144) directly connects to the calling IP-PBX 13 according to the Internet address of the calling IP-PBX 13 since the called device (e.g., the smartphone ZM1 144) can access the Internet. Instead of using the corresponding IP-PBX 14 to connect to the calling IP-PBX 13, the called device (e.g., the smartphone ZM1 144) directly connects and communicates with the calling IP-PBX 13.

Figure 8:
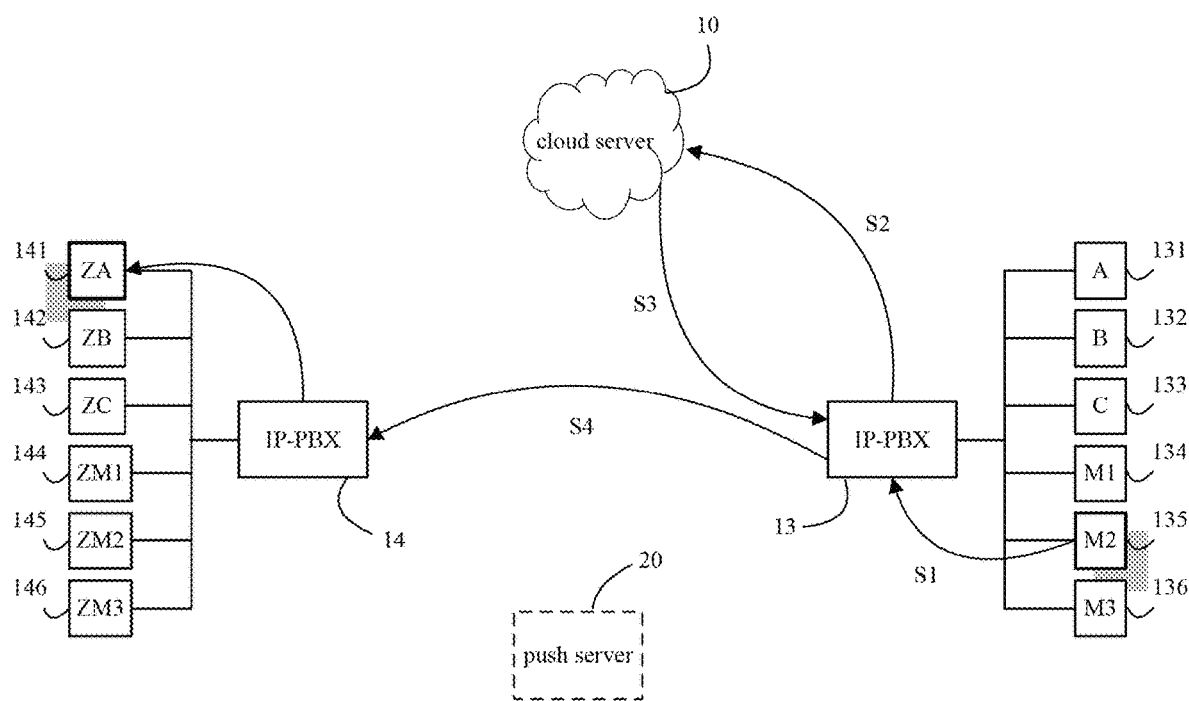
FIG. 8 is a diagram schematically illustrating a telephone communication system according to an embodiment of the present invention, wherein a smartphone bound to an IP-PBX dials a desktop phone.

The present invention disclosed that different calling devices generate calling request to the IP-PBXs corresponding to different called devices. Refer to FIG. 8. FIG. 8 is a diagram schematically illustrating a telephone communication system according to an embodiment of the present invention, wherein a smartphone bound to an IP-PBX dials a desktop phone. The smartphone M2 135 bound to the IP-PBX 13 dials an extension ZA 141 connected to the IP-PBX 14. The smartphone M2 135 bound to the IP-PBX 13 is a calling device that generates a calling request. The calling request is transmitted using the IP-PBX 13. The IP-PBX 13 transmits the calling request to the cloud server 10 after receiving the calling request, as shown by Step S2. Step S2 is included in Step S10. In other words, the cloud server 10 determines that the source of the calling request is the smartphone M2 135 connected to the IP-PBX 13. Besides, Step S2 is also included in Step S22. The calling IP-PBX 13 transmits the calling request to the cloud server 10 and requests to determine whether the called extension ZA 141 (e.g., the called device) is the effective device in the system. The cloud server 10 determines whether the extension ZA 141 (e.g., the called device) is the effective device. Then, in Step S24 of Step S20, the process determines whether the called device (e.g., the extension ZA 141) is connected to the IP-PBX 14. In the embodiment, the called device (e.g., the extension ZA 141) is connected to the IP-PBX 14. Thus, the dynamic IP-PBX assigning process satisfying condition S32 is performed. The dynamic IP-PBX assigning process satisfying condition S32 further comprises: Step S321: the cloud server 10 transmits the Internet protocol address of the called IP-PBX 14 to the calling IP-PBX 13, as shown by Step S3; and Step S322: the calling IP-PBX 13 receives the Internet protocol address of the called IP-PBX 14 and establishes a connection with the called IP-PBX 14 according to the Internet protocol address of the called IP-PBX 14. The called IP-PBX 14 directly assigns a particular telephone "line" to the extension ZA 141 when the calling IP-PBX 13 connects to the called IP-PBX 14 since the extension ZA 141 is directly dialed.

In addition, the cloud server establishes a device registered table to record the device identifications and the system assigning codes of the plurality of IP-PBXs and the plurality of second voice call devices when the plurality of IP-PBXs and the plurality of second voice call devices are registered in the cloud server. The device registered table may record the required information of the plurality of IP-PBXs and the plurality of second voice call devices arranged into an array or comprise corresponding tables that respectively record the required information of the plurality of IP-PBXs and the plurality of second voice call devices arranged into an array.

In conclusion, the present invention provides a telephone communication system and a method for IP-PBXs, which use a dynamic IP-PBX assigning process to directly connect and communicate a calling device with a called device, thereby saving the consumption of network bandwidth and improving the efficiency for communication and connection.

The embodiments described above are only to exemplify the present invention but not to limit the scope of the present invention. Therefore, any equivalent modification or variation according to the various mobile functions, human-machine interaction applications, shapes, structures, features, or spirit disclosed by the present invention is to be also included within the scope of the present invention.

What is claimed is:

1. A telephone communication method performed in a system including a cloud server, Internet Protocol Private Branch Exchanges (IP-PBXs), and voice call devices, two of the voice call devices are respectively used as a calling device and a called device, the calling device directly connects and communicates with the called device using a dynamic IP-PBX assigning process, and the telephone communication method comprising:

(A): by the cloud server, determining a source of a calling request;

(B): by the cloud server, determining a situation of the called device and determining whether the called device is an effective device; and (C): performing the dynamic IP-PBX assigning process according to the situation of the called device, wherein a calling IP-PBX or the calling device obtains information including a device identification (ID) and an Internet protocol (IP) address and corresponding to the called device based on operation (A), operation (B) and operation (C), to establish identity confirmation and a connection between the calling device and the called device in a push-notification way or a cloud-command way, and wherein the dynamic IP-PBX assigning process satisfies one of conditions (C1), (C2), and (C3):

(C1): the cloud server transmits the calling request;
(C2): the called device is connected to a called the IP-PBX; and (C3): the called device is not connected to the called the IP-PBX.

2. The method according to claim 1, wherein the voice call device is a desktop phone or a smartphone.

3. The method according to claim 2, wherein the smartphone is installed with an application program.

4. The method according to claim 1, wherein the IP-PBX is installed with an application program.

5. The method according to claim 1, wherein in operation (A), the cloud server determines that the source of the calling request is the calling the IP-PBX or the cloud server.

6. The IP-PBX system according to claim 1, wherein operation (B) further comprises:

(B1): performing operation (B2) when the calling the IP-PBX transmits the calling request, and the dynamic IP-PBX assigning process satisfying condition (C1) when the cloud server transmits the calling request;

(B2): the calling the IP-PBX transmitting the calling request to the cloud server and requesting the cloud server to determine whether the called device is the effective device;

(B3): the cloud server determining whether the called device is the effective device:
if no, transmitting an ineffective message to the calling the IP-PBX and rejecting the calling request; and
if yes, performing operation (B4);

(B4): the cloud server determining whether the called device is connected to the called the IP-PBX:
if yes, performing operation (B5); and
if no, performing operation (B6);

(B5): transmitting an Internet protocol (IP) address of the called the IP-PBX to the calling the IP-PBX and the dynamic IP-PBX assigning process satisfying condition (C2); and (B6): transmitting a device identification (ID) of the called device to the calling the IP-PBX and the dynamic IP-PBX assigning process satisfying condition (C3).

7. The method according to claim 1, wherein the dynamic IP-PBX assigning process satisfying condition (C1) further comprises:

(C11): the cloud server transmitting the calling request to the called the IP-PBX connected to the called device and requesting the called the IP-PBX to determine whether the called device accepts the calling request;

(C12): the called the IP-PBX transmitting its Internet protocol address to the cloud server after the called the IP-PBX determines that the called device accepts the calling request, and the called the IP-PBX transmitting a rejecting message to the cloud server when the called device rejects the calling request;

(C13): the cloud server transmitting the Internet protocol address of the called the IP-PBX to the calling device;

(C14): the calling device establishing a connection with the called the IP-PBX according to the Internet protocol address of the called the IP-PBX and transmitting a calling invitation to the called device; and (C15): the called the IP-PBX establishing a calling connection between the calling device and the called device after the called the IP-PBX accepts the calling invitation.

8. The method according to claim 7, wherein operation (C12) further comprises a step of establishing a call waiting sequence for recording related information of the calling request.

9. The method according to claim 7, wherein operation (C12) further comprises a step of transmitting a key to the cloud server, and in operation (C13), the cloud server transmits the key to the calling device.

10. The method according to claim 7, wherein operation (C14) further comprises a step of transmitting a key to the called the IP-PBX.

11. The method according to claim 10, wherein operation (C15) further comprises a step of using the called the IP-PBX to perform a key-decrypting certification process, and the calling invitation is accepted and the calling connection between the calling device and the called device is established when the key-decrypting certification process is successful.

12. The method according to claim 7, wherein operation (C15) further comprises a step of using the called the IP-PBX to perform a key-decrypting certification process, and the calling invitation is accepted and the calling connection between the calling device and the called device is established when the key-decrypting certification process is successful.

13. The method according to claim 1, wherein the dynamic IP-PBX assigning process satisfying condition (C2) further comprises:

(C21): the cloud server transmitting an Internet protocol address of the called the IP-PBX to the calling the IP-PBX;

(C22): the calling the IP-PBX receiving the Internet protocol address of the called the IP-PBX, thereby establishing a connection with the called the IP-PBX and transmitting a calling invitation to the called the IP-PBX;

(C23): the called the IP-PBX transmitting a device identification of the called device to the calling the IP-PBX after the called the IP-PBX accepts the calling invitation;

(C24): the calling the IP-PBX receiving the device identification of the called device, editing a calling push document to record the device identification of the called device and an Internet protocol address of the calling the IP-PBX, transmitting the calling push document to a push server, and requesting the push server to transmit a calling push notification and the calling push document to the called device;

(C25): the called device receiving the calling push notification and establishing a connection with the calling the IP-PBX according to a content of the calling push document; and (C26): the calling the IP-PBX establishing a calling connection between the called device and the calling device.

14. The method according to claim 13, wherein the calling push document further comprises a set of system assigning codes.

15. The method according to claim 1, wherein the dynamic IP-PBX assigning process satisfying condition (C3) further comprises:
- (C31): the cloud server transmitting a device identification of the called device to the calling the IP-PBX;
- (C32): the calling the IP-PBX editing a calling push document to record a device identification of the called device and an Internet protocol address of the calling the IP-PBX, transmitting the calling push document to a push server, and requesting the push server to transmit a calling push notification and the calling push document to the called device;
- (C33): the called device receiving the calling push notification and the calling push document, establishing a connection with the calling the IP-PBX according to a content of the calling push document, and registering related information and an Internet protocol address of the called device in the calling the IP-PBX; and
- (C34): the calling the IP-PBX transmitting a calling invitation to the called device, and the called device establishing a calling connection between the called device and the calling device after the called device accepts the calling invitation.

16. The method according to claim 15, wherein the calling push document further comprises a set of system assigning codes.

17. A telephone communication system comprising:
- a cloud server;
- a plurality of Internet Protocol Private Branch Exchanges (IP-PBXs) registered in the cloud server, each of the plurality of IP-PBXs is installed with a first application program and provided with first voice call devices, each of the first voice call devices is assigned with a set of extension codes, and each of the plurality of IP-PBXs uses the first application program to manage voice call functions of the first voice call devices; and
- a plurality of second voice call devices registered in the cloud server, each of the plurality of second voice call devices is installed with a second application program to perform voice call functions, and the cloud server assigns a set of system assigning codes to each of the plurality of IP-PBXs and the plurality of second voice call devices, wherein, to establish identity confirmation and a connection between a calling device and a called device in a push-notification way or a cloud-command way, the calling device obtains information including a device identification (ID) and an Internet protocol (IP) address and corresponding to the called device based on determination a source of a calling request, determination of a situation of the called device and whether the called device is an effective device operation and performance of a dynamic IP-PBX assigning process according to the situation of the called device, and wherein when the calling device is one of (a) a first one of the first voice call devices and (b) a first one of the second voice call devices, and the called device is one of (a) a second one of the first voice call devices and (b) a second one of the second voice call devices.

18. The system according to claim 17, wherein each of the plurality of second voice call devices is a smartphone and the first voice call device is a desktop phone.

19. The system according to claim 17, wherein the cloud server establishes a device registered table to record device identifications and system assigning codes of the plurality of IP-PBXs and the plurality of second voice call devices when the plurality of IP-PBXs and the plurality of second voice call devices are registered in the cloud server.

20. The system according to claim 19, wherein the device registered table records required information of the plurality of IP-PBXs and the plurality of second voice call devices arranged into an array or comprises corresponding tables that respectively record required information of the plurality of IP-PBXs and the plurality of second voice call devices arranged into an array.

* * * * *